Figure 1A:
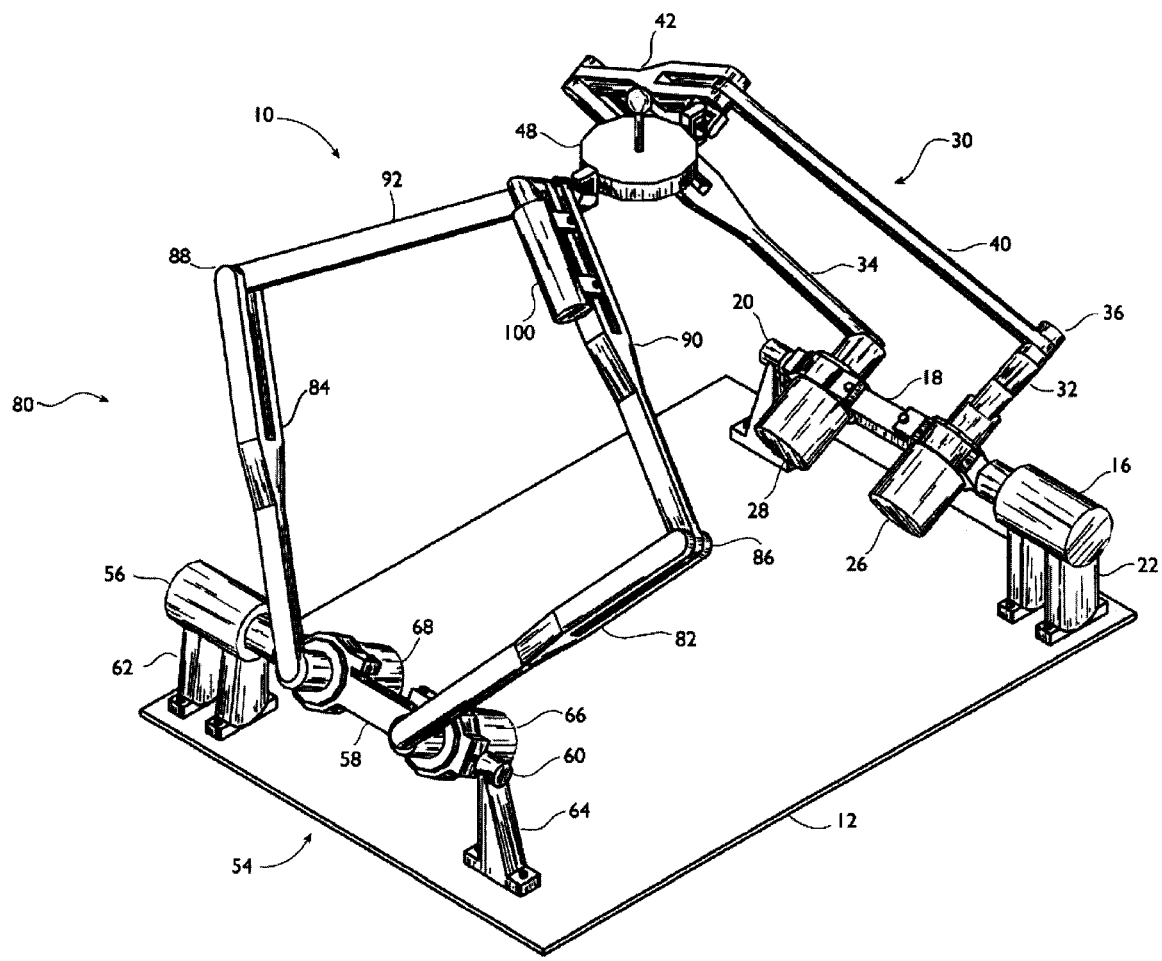

United States Patent
Stocco et al.

[19]

[11] Patent Number: 6,047,610
[45] Date of Patent: Apr. 11, 2000

[54] HYBRID SERIAL/PARALLEL MANIPULATOR

[76] Inventors: Leo J Stocco, 404 - 2370 West 2$^{nd}$Avenue, Vancouver, Canada, V6K 1J2; Septimiu E Salcudean, 3936 West 32$^{nd}$Avenue, Vancouver, Canada, V6S 1Z3

[21] Appl. No.: 08/844,457

[22] Filed: Apr. 18, 1997

[51] Int. Cl.$^7$ ............................................. G05G 11/00
[52] U.S. Cl. ............................... 74/479.01; 74/490.03; 901/23
[58] Field of Search .................... 74/479.01, 490.01, 74/490.03, 490.05, 490.07; 901/16, 23

[56] References Cited

U.S. PATENT DOCUMENTS

| | | |
|---|---|---|
| 3,215,391 | 11/1965 | Storm . |
| 4,216,467 | 8/1980 | Colston . |
| 4,437,635 | 3/1984 | Pham . |
| 4,651,589 | 3/1987 | Lambert . |
| 4,762,016 | 8/1988 | Stoughton . |
| 4,790,718 | 12/1988 | Vickers . |
| 4,806,068 | 2/1989 | Kohli . |
| 4,819,496 | 4/1989 | Shelef ................................. 74/490.03 |
| 4,919,382 | 4/1990 | Forman . |
| 4,976,582 | 12/1990 | Clavel . |
| 4,988,244 | 1/1991 | Sheldon . |
| 5,007,300 | 4/1991 | Siva . |
| 5,028,180 | 7/1991 | Sheldon . |
| 5,053,687 | 10/1991 | Merlet . |
| 5,114,300 | 5/1992 | Shahinpoor et al. . |
| 5,223,776 | 6/1993 | Radke . |
| 5,263,382 | 11/1993 | Brooks et al. . |
| 5,271,290 | 12/1993 | Fischer . |
| 5,279,176 | 1/1994 | Tahmasebi et al. . |
| 5,301,566 | 4/1994 | Tahmasebi et al. . |
| 5,333,514 | 8/1994 | Toyama et al. . |
| 5,354,158 | 10/1994 | Sheldon et al. . |
| 5,388,935 | 2/1995 | Sheldon . |
| 5,401,128 | 3/1995 | Lindem et al. . |
| 5,556,242 | 9/1996 | Sheldon et al. ........................... 901/23 |
| 5,568,993 | 10/1996 | Potzick . |
| 5,656,905 | 8/1997 | Tsai ........................................ 74/479.01 |
| 5,715,729 | 2/1998 | Toyama et al. ....................... 74/490.03 |

FOREIGN PATENT DOCUMENTS

| | | |
|---|---|---|
| 0493795A1 | 12/1991 | European Pat. Off. . |
| 2 228 783 | 1/1990 | United Kingdom . |
| WO95/11780 | 10/1994 | WIPO . |

OTHER PUBLICATIONS

Stocco, L and Salcudean, S.E., "A Coarse–Fine Approach to Force–Reflecting Hand Controller Design", IEEE International Conference on Robotics and Automation, Minneapolis, Minnesota, Apr. 22, 1996.

Stocco, L, Salcudean, S.E. and Sassani, F., "Optimal Design of A Multi–DOF Haptic Interface", Sixth Annual Symposium on Haptic Interfaces for Virtual Environment and Teleoperator Systems, International Mechanical Engineering Congress and Exposition, ASME Winter Meeting, 1997.

Stewart D., "A Platform with Six Degrees of Freedom", Proceedings of The Institution of Mechanical Engineers, London, England, vol. 180, Part 1, No. 5, pp 371–386, 1965.

(List continued on next page.)

*Primary Examiner*—John A. Jeffery
*Assistant Examiner*—David Fenstermacher
*Attorney, Agent, or Firm*—C. A. Rowley

[57] ABSTRACT

A six degree of freedom structure forming a robotic manipulator, consisting of two five-bar linkages (30 and 80) set on rotatable base linkages (18 and 58); the output points (44 and 94) of the five-bar linkages (30 and 80) are attached to a rigid payload platform (48) by universal joints (46 and 96), respectively. Each linkage (30 and 80) on its rotatable bass can position its output point in three degrees of freedom, but since the two five-bar linkages (30 and 80) are tied together at the platform (48), five degree of freedom motion of the platform (48) results—three degrees of freedom in translation, and two of rotation. A seventh motor (100), mounted for example on one of the five bar linkages, provides power to rotate the platform about the axis defined by the two universal joints (46 and 96). The rotational torque is coupled through one of the universal joints (46 or 96).

2 Claims, 19 Drawing Sheets

OTHER PUBLICATIONS

Stoughton R. & Arai T., "A Modified Stewart Platform Manipulator with Improved Dexterity", IEEE Transactions on Robotics and Automation, vol. 9, No. 2, pp. 166–173, Apr. 1993.

Arai t., Cleary K., Nakamura T., Adachi H. & Homma K., "Design, Analysis and Construction of a Prototype Parallel Link Manipulator", IEEE International Workshop on Intelligent Robots and Systems, pp. 205–212, 1990.

Arai T., Stoughton R., Homma K., Adachi H., Nakamura T. & Nakashim K., "Development of a Parallel Link Manipulator", IEEE International Conference on Robotics and Automation, pp. 839–844, 1991.

Pierrot F., Dauchez P. & Fournier A., "HEXA: A Fast Six–DOF Fully–Parallel Robot", IEEE International Conference on Robotics and Automation, pp. 1158–1163, 1991.

Cleary K. & Brooks T., "Kinematic Analysis of a Novel 6–DOF Parallel Manipulator", IEEE International Conference on Robotics and Automation, Atlanta, Georgia, pp. 708–713, 1993.

Hollerbach J. & Lokhorst D., "Closed–Loop Kinematic Calibration of the RSI 6–DOF Hand Controller", IEEE International Conference on Robotics and Automation, pp. 142–148, 1993.

Iwata H., "Artificial Reality with Force–feedback: Development of Desktop Virtual Space with Compact Master Manipulator", SIGGRAPH, Dallas, Texas, vol. 24, No. 4, pp. 165–170, Aug. 6–10, 1990.

Long G. & Collings C., "A Pantograph Linkage Parallel Platform Master Hand Controller for Force–Reflection", IEEE International Conference on Robotics and Automation, Nice, France, pp. 390–395, May 1992.

Mimura N. & Funahashi Y., "A New Analytical System Applying 6 DOF Parallel Link Manipulator for Evaluating Motion Sensation", IEEE International Conference on Robotics and Automation, pp. 227–233, 1995.

Iwata H., "Pen–based Haptic Virtual Environment", IEEE International Symposium Conference on Robotics and Automation, pp. 287–292, 1993.

Behi F., "Kinematic Analysis for a Six–Degree–of–Freedom 3–PRPS Parallel Mechanism", IEEE Journal of Robotics and Automation, vol. 4, No. 4, pp. 561–565, Oct. 1988.

Hudgens J. & Tesar D., "Analysis of a Fully–Parallel Six Degree–of–Freedom Micromanipulator", IEEE International Conference on Advanced Robotics, pp. 814–819, 1992.

Mouly N. & Maerlet J., "Singular Configurations and Direct Kinematics of a New Parallel Manipulator", IEEE International Conference on Robotics and Automation, Nice, France, pp. 338–343, May, 1992.

Millman, P.A. and J.E. Colgate, "Design of a four degree–of–freedom force–reflecting manipulandum with a specified force/torque workspace", Proc. IEEE Int. conf. Robotics & Auto. Sacramento, California, pp. 1488–1493, Apr. 9–11, 1991.

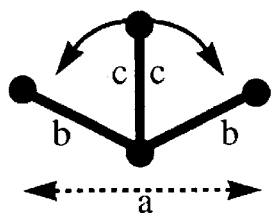
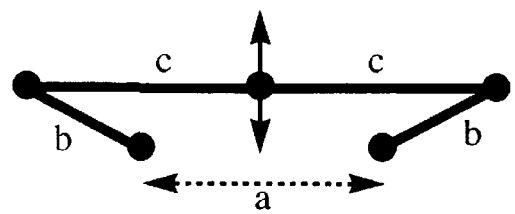
FIG. 12A                    FIG. 12B
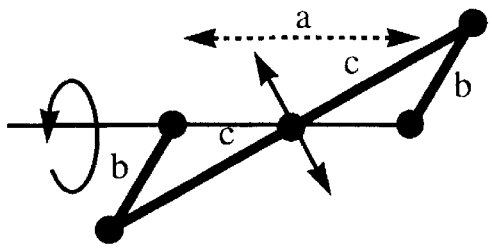
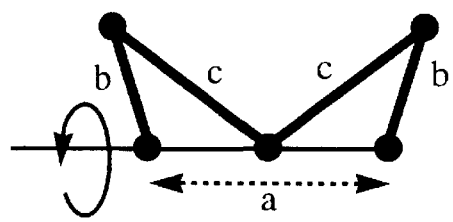
FIG. 12C                    FIG. 12D

HYBRID SERIAL/PARALLEL MANIPULATOR

TECHNICAL FIELD

This invention relates to robotic manipulators in general and in particular to such manipulators having all but one drive actuator attached to the parts of the linkage near the base so as to impart high resolution and high stiffness motion to a platform in six degrees of freedom.

BACKGROUND ART

Many attempts have been made to design mechanisms for the six degree of freedom (6-DOF) control of a moveable platform. The applications have been diverse, from machine tool positioning to realistic force-reflecting master hand controllers.

Stewart Platform

One of the oldest mechanisms for platform control is the Stewart platform (Stewart D., 1965, "A Platform with Six Degrees of Freedom", Proceedings of The Institution of Mechanical Engineers, London, England, Vol 180, pp 371–386). It is in wide use for heavy-lift applications such as aircraft simulators. Six struts are used to join a suspended platform to its base; they lie along the edges of an octahedron, to give a highly symmetric arrangement. Each strut contains a prismatic (sliding) actuator, and is connected to the base by a universal joint (two orthogonal intersecting revolute joints) and to the platform by a spherical joint (three orthogonal intersecting revolute joints).

Crossed-strut Stewart platform

Staughton and Arai (Stoughton R. & Arai T., 1993, "A Modified Stewart Platform Manipulator with Improved Dexterity", IEEE International Conference on Robotics and Automation) suggest an improvement over the Stewart platform, created by allowing the struts to cross over one another, and attach at more distant points on the base and platform. Three struts are mounted with their end points on an outer circle, with the intervening three on an inner circle. The longer struts are closer to horizontal, giving improved force capacity in the plane parallel to the base and increased torque about a normal to the base.

Arai et al (Arai T., Stoughton R., Homma K., Adichi H., Nakamura T. & Nakashima K. 1991, "Development of a Parallel Link Manipulator", IEEE International Conference on Robotics and Automation) describe a modified Stewart platform with six struts crossed over to give near-isotropic force and moments, with some workspace limitations. The application is an underground excavation task.

Six-Arm Design, with Serial Linkages in Each Arm.

Pierrot et al (Pierrot F., Dauchez P. & Fournier A., 1991, "HEXA: A Fast Six-DOF Fully-Parallel Robot", IEEE International Conference on Robotics and Automation) describe a design with six independent articulated arms supporting a plate hanging below a base. The arms are arranged in pairs in order to simplify the arrangement of actuators; each arm is driven by a rotary actuator at the shoulder that alters the arm's pitch.

Triple Arm Designs, with Five-Bar Linkages in Each Arm.

Cleary and Brooks (Cleary, K. and Brooks, T., 1993, "Kinematic Analysis of a Novel 6-DOF Parallel Manipulator", IEEE International Conference on Robotics and Automation, Atlanta, Ga., pp. 708–713) present a 6-DOF device combining three 2-DOF linkages. Driven by a pair of motors through a differential gear, each linkage can be rotated in pitch and roll to steer the suspended platform.

Triple Arm Designs, with Five-Bar Linkages in Each Arm.

Iwata (Iwata H., 1990, "Artificial Reality with Force-feedback: Development of Desktop Virtual Space with Compact Master Manipulator", SIGGRAPH, Dallas, Tex., Vol. 24, No. 4, pp. 165–170) built a 9-DOF device that provides 6-DOF motion to the hand and 1-DOF motion to each of three fingers. The main platform motion is provided by three pantographs (five-bar linkages with zero length base member) connected by universal joints (U-joints) to the corners of the triangular platform. Each pantograph is driven by two rotary actuators at the base.

Long and Collins (Long G. & Collings C., "A Pantograph Linkage Parallel Platform Master Hand Controller for Force-Reflection", IEEE International Conference on Robotics and Automation, Nice, France, May 1992, p 390) report a 6-DOF joystick with three parallel pantograph linkages.

Mimura and Funahashi (Mimura, N. and Funahashi, Y., 1995, "A new analytical method applying 6 DOF parallel link manipulator for evaluating motion sensation", IEEE International Conference on Robotics and Automation, p 227) describe a similar mechanism, with three five-bar mechanisms (with no-zero length base links) in place of the pantographs. Double Arm Design, with Serial Linkages in Each Arm.

Iwata (Iwata H., 1993, "Pen-based Haptic Virtual Environment", IEEE International Symposium Conference on Robotics and Automation) presented a 6-DOF haptic pen positioned by two 3-DOF serial manipulators. One end of the pen is connected to one of the manipulators by a universal joint (two orthogonal recolute joints with intersecting axes), while the other end is connected to the second manipulator through a screw mechanism and a universal joint. If the two robots move such that the distance between the universal joint centers is constant, the pen moves with five degrees of freedom: three in translation and two in rotation (pitch and roll about the pen). Changes in the distance between the two universal joint centers result in a yawing motion of the pen due to the screw mechanism.

Rigid Strut Designs, with Base-Sliding Supports

Behi (Behi F., 1988, "Kinematic Analysis for a Six-Degree-of-Freedom 3-PRPS Parallel Mechanism", IEEE Journal on Robotics and Automation) describes a robot manipulator with three rigid struts. The struts are attached by spherical joints to the corners of a triangular platform, and at their other ends to sliders which run along the sides of a triangular base. Each of the three sliders carries a rotary actuator, which controls the pitch of the strut attached to that slider.

Hudgens and Tesar (Hudgens J. and Tesar D., 1992, "Analysis of a Fully-Parallel Six Degree-of-Freedom Micromanipulator", IEEE International Conference on Advanced Robotics) present a device with six rigid struts attached by spherical joints to both the platform and the base. The joints are equidistant from the centers of the platform and the base; the struts are arranged in three pairs, the members of each pair being parallel and a short distance apart. The base joints can be pulled or pushed (by actuators connected to eccentric drives) along the circumference of the base circle, thereby giving rise to small movement in the platform.

A device presented by Mouly and Merlet (Mouly N. & Merlet J., 1992, "Singular Configurations and Direct Kinematics of a New Parallel Manipulator", IEEE International Conference on Robotics and Automation, Nice, France, pp 338–343) also has six rigid struts; these are connected by spherical joints at one of their ends the corners of a triangular platform, and at the other end (by U-joints) to moveable supports near the corners of a triangular base. The supports move vertically, so the end of each strut can rise and fall relative to the surface of the base.

OBJECTS AND ADVANTAGES

It is therefore an object of the present invention to provide six degree of freedom translation and orientation to a platform, for the purpose of creating a manipulator without the disadvantages mentioned in the previous section.

The primary advantage is the provision of the largest possible non-singular workspace. A secondary advantage is the smaller number of linkages and pivots, resulting in less friction, backlash, mass and potential for collisions between linkage elements.

An object is to produce a device having fewer geometric design parameters, thus easing its design for a specific application.

Another object of the present invention is to mount motors wherever possible next to the fixed base, in order to reduce the inertial load.

A further object of the present invention is to simplify the control computations. By allowing analytical solutions of both the inverse and forward kinematics, it avoids the complex control calculations that plague many parallel devices.

Further objects and advantages of the hybrid serial/parallel mechanism will become apparent from a consideration of the drawings and the ensuing description.

DRAWING FIGURES

Further features, objects and advantages will be evident from the following detailed description of the preferred embodiments of the present invention taken in conjunction with the accompanying drawings in which FIG. 1A. South-West orthographic view of hybrid serial/parallel manipulator.

Figure 1B:
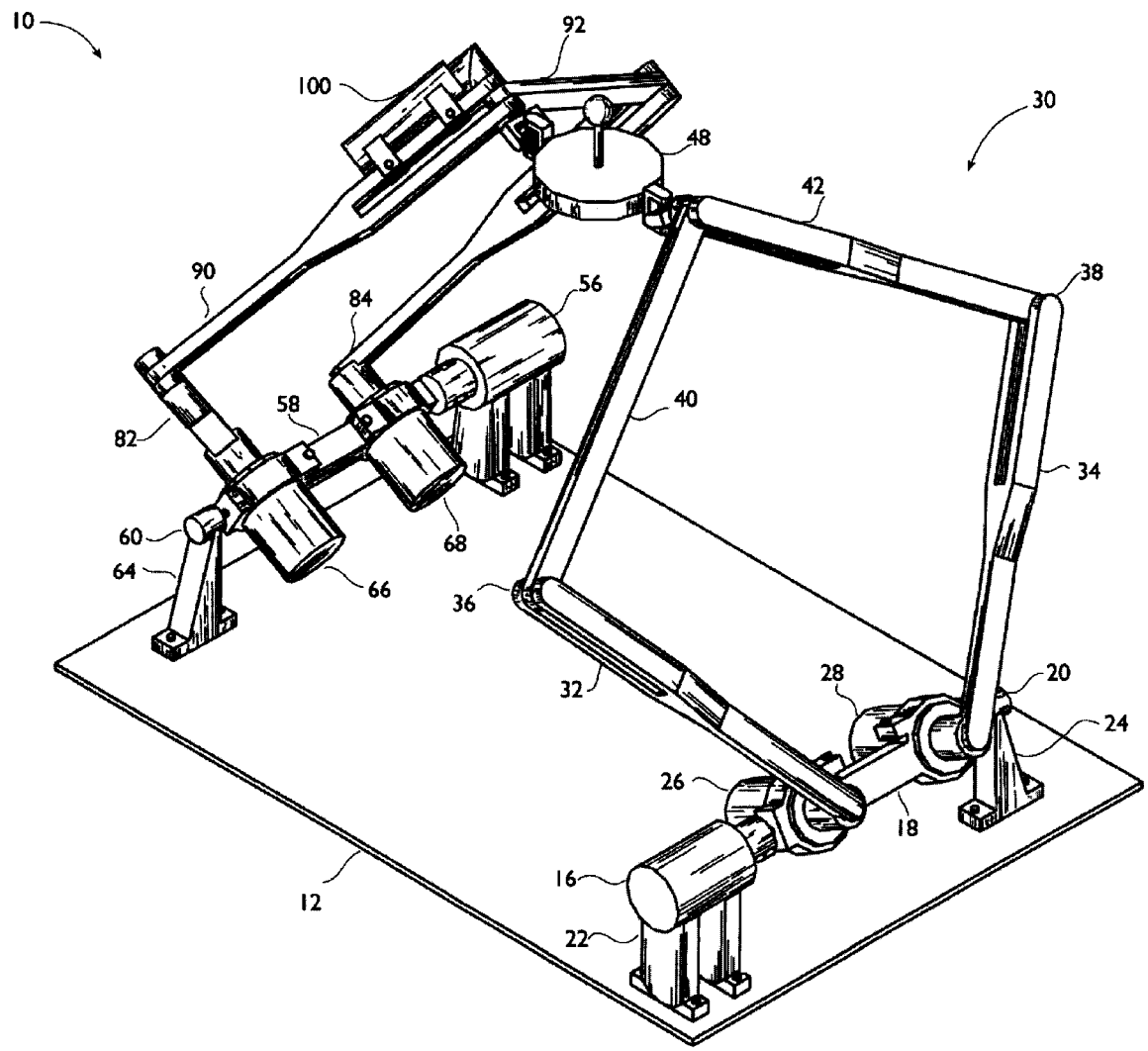

FIG. 1B. South-East orthographic view of hybrid serial/parallel manipulator.

Figure 1C:
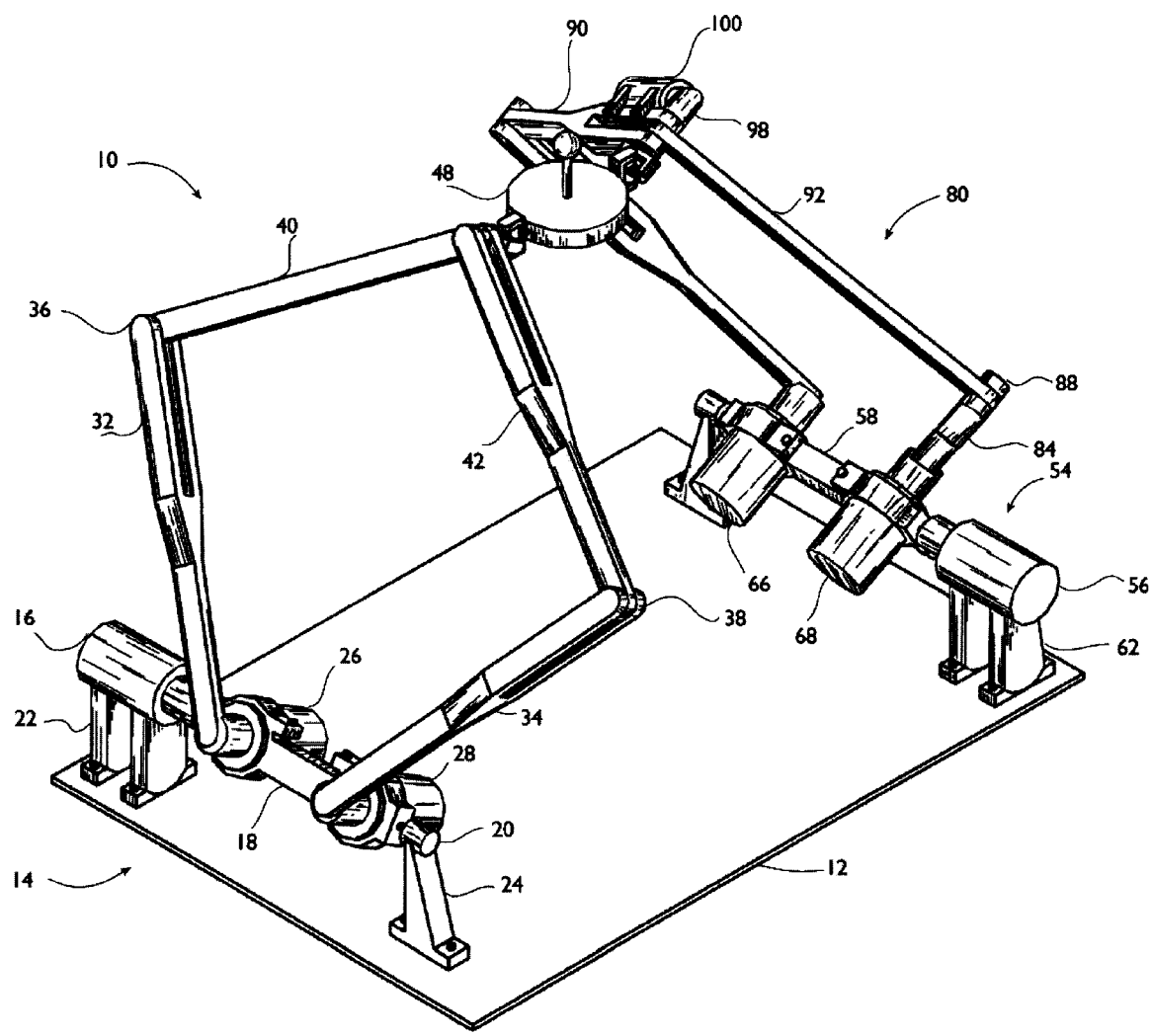

FIG. 1C. North-East orthographic view of hybrid serial/parallel manipulator.

Figure 1D:
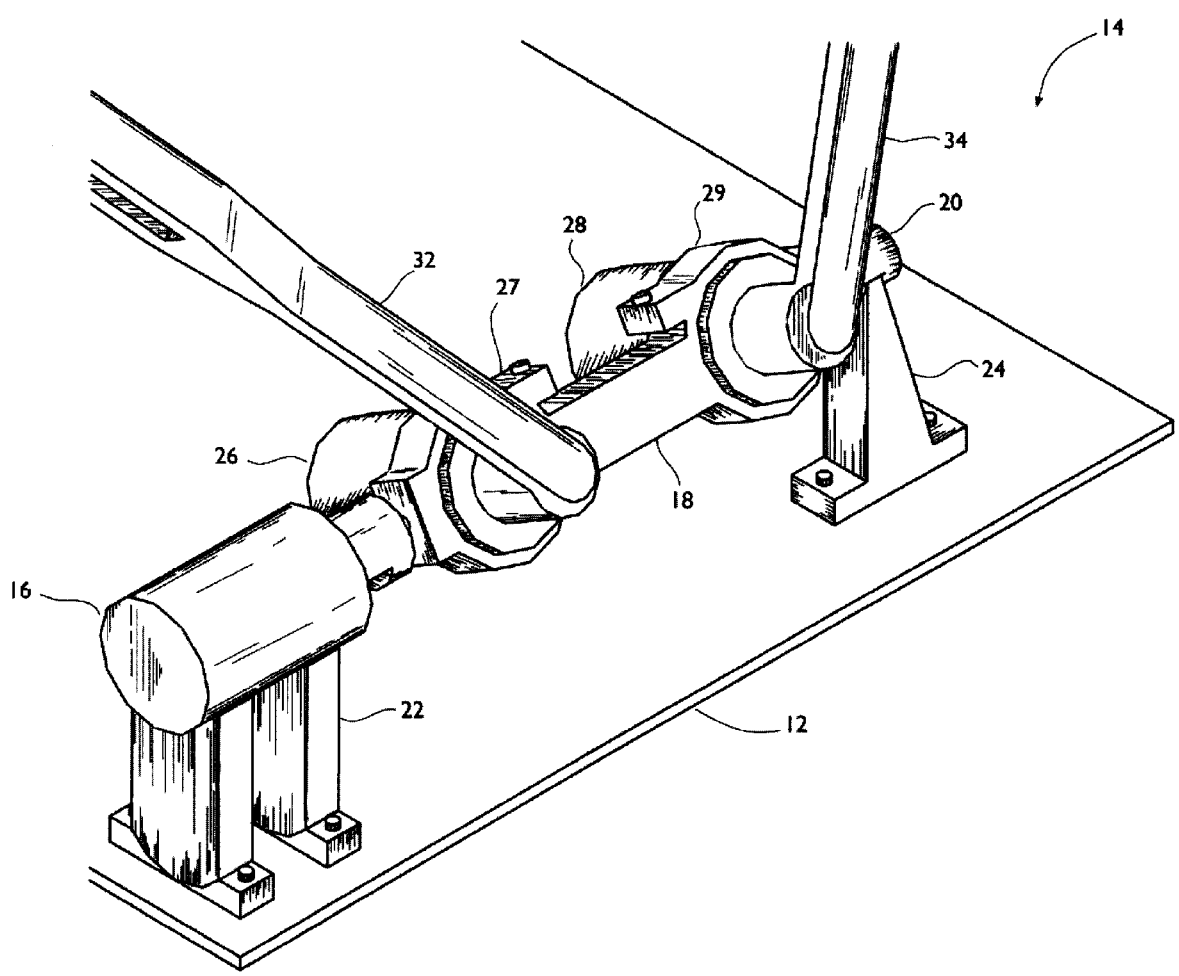

FIG. 1D. East side waist/shoulder assembly.

Figure 1E:
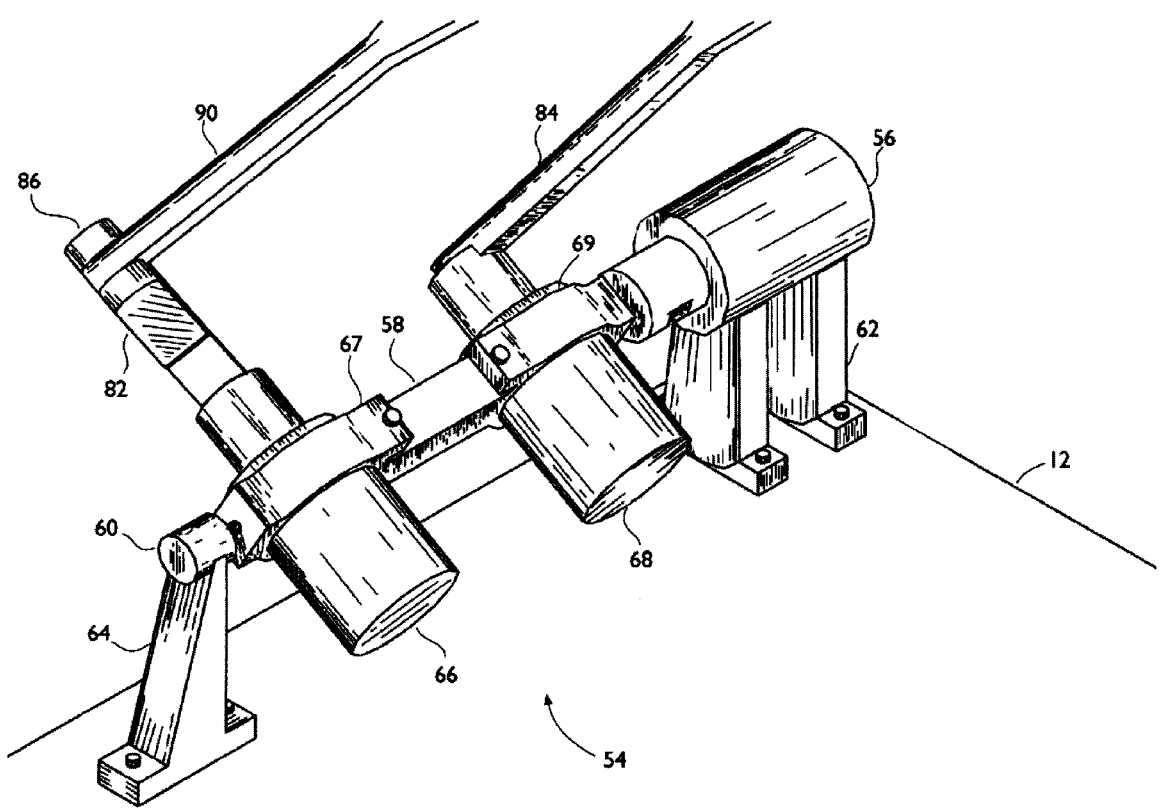

FIG. 1E. West side waist/shoulder assembly.

Figure 1F:
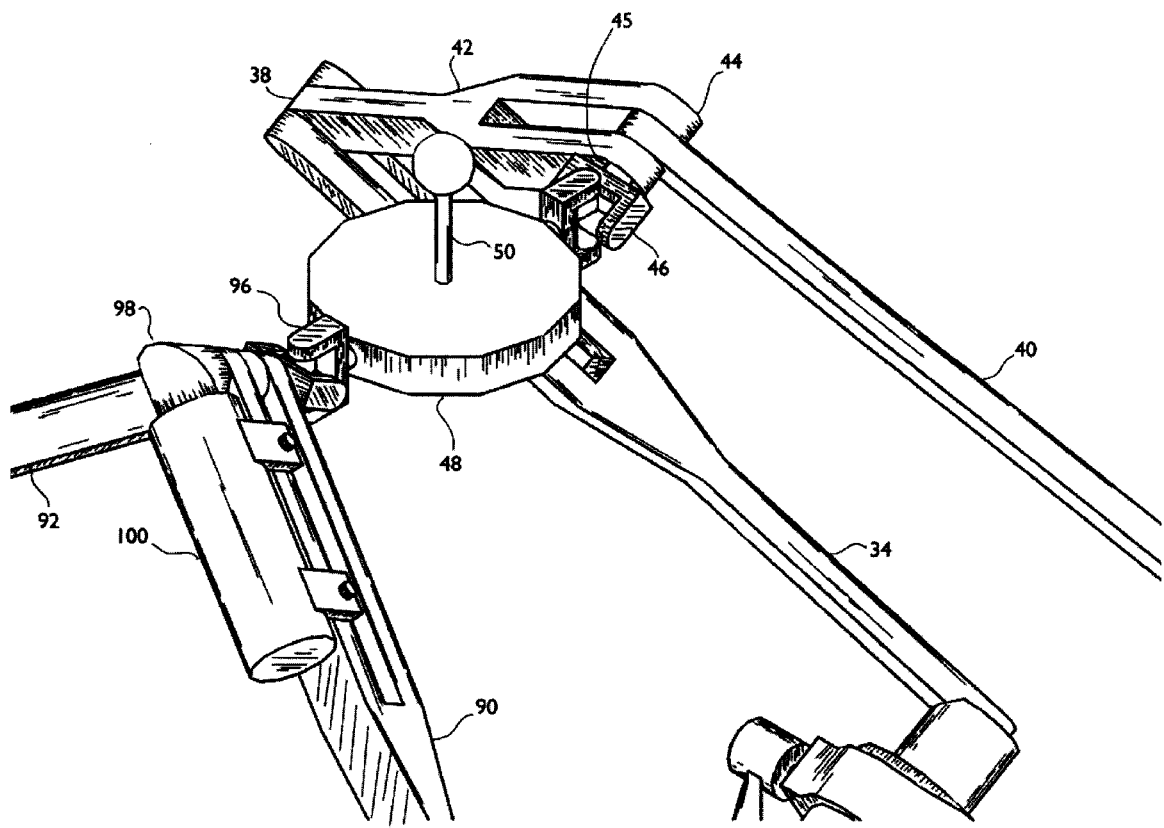

FIG. 1F. South-West view of platform and wrist assembly.

Figure 1G:
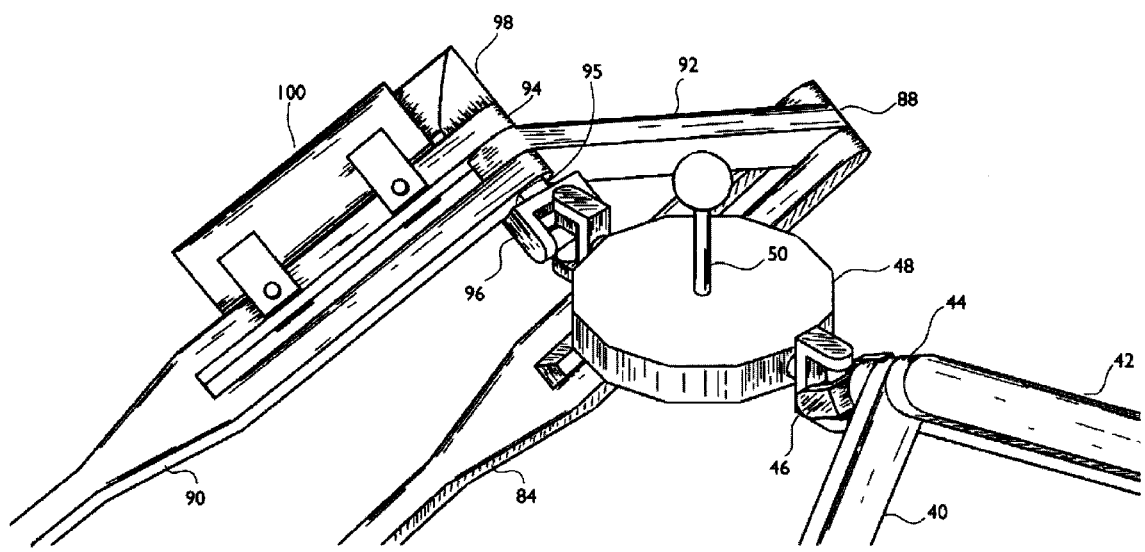

FIG. 1G. South-East view of platform and wrist assembly.

Figure 2:
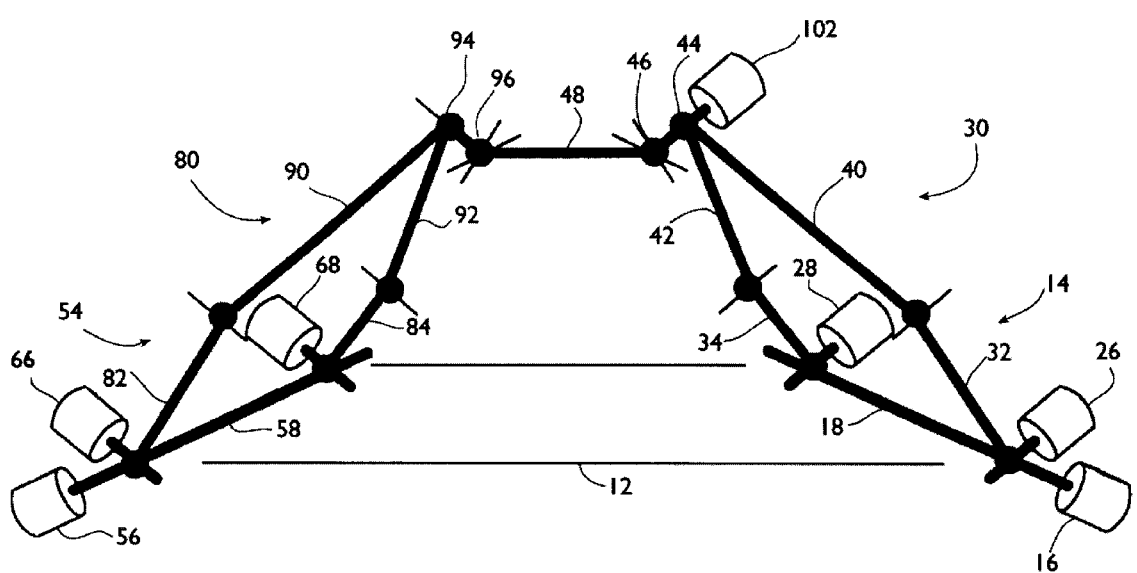

FIG. 2. Redundantly actuated hybrid serial/parallel manipulator.

Figure 3:
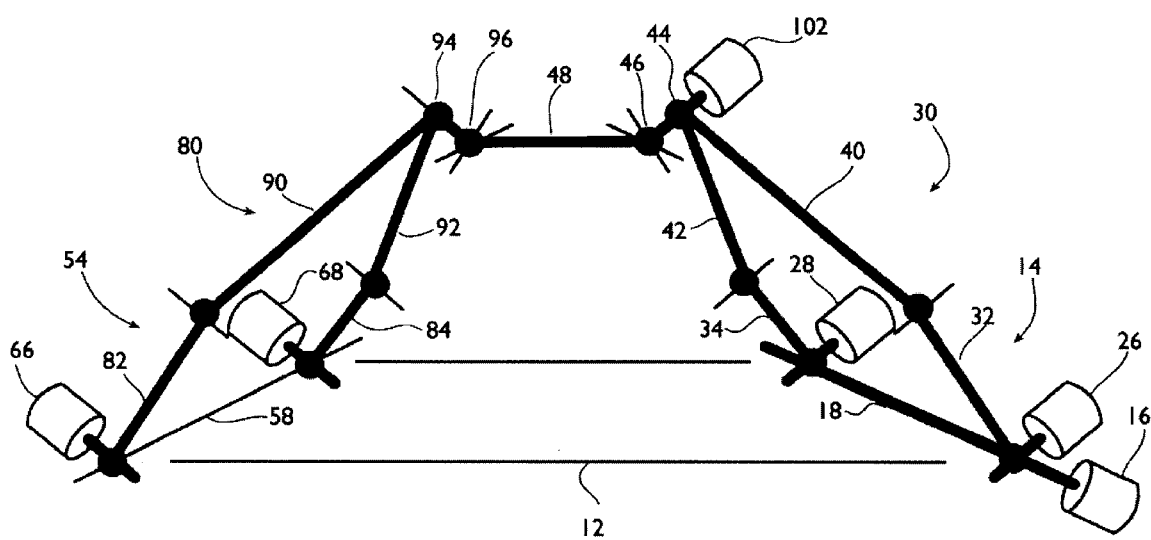

FIG. 3. End-effector actuated hybrid serial/parallel manipulator.

Figure 4:
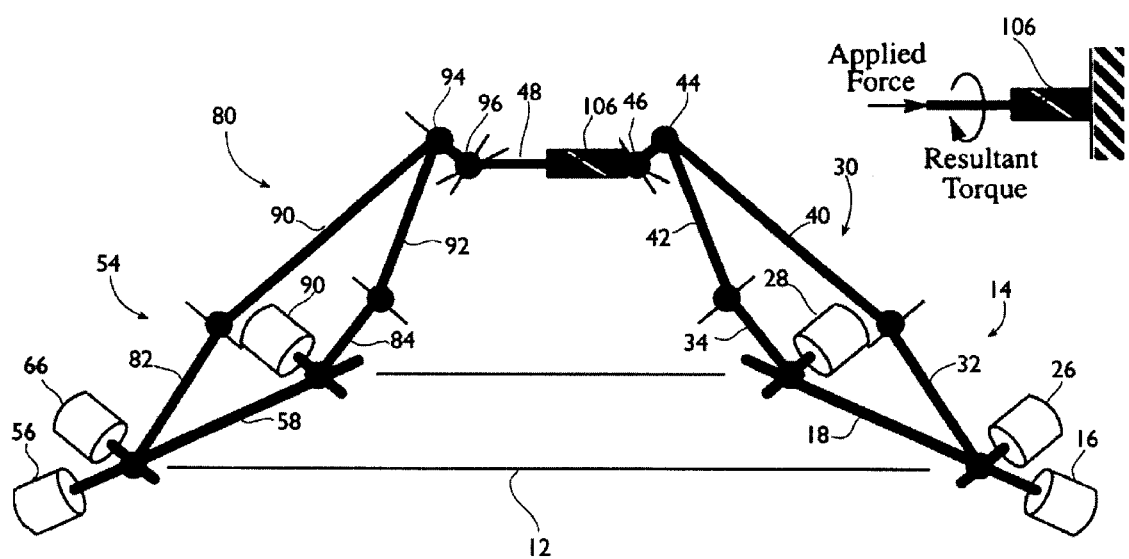

FIG. 4. Base actuated hybrid serial/parallel manipulator.

Figure 5:
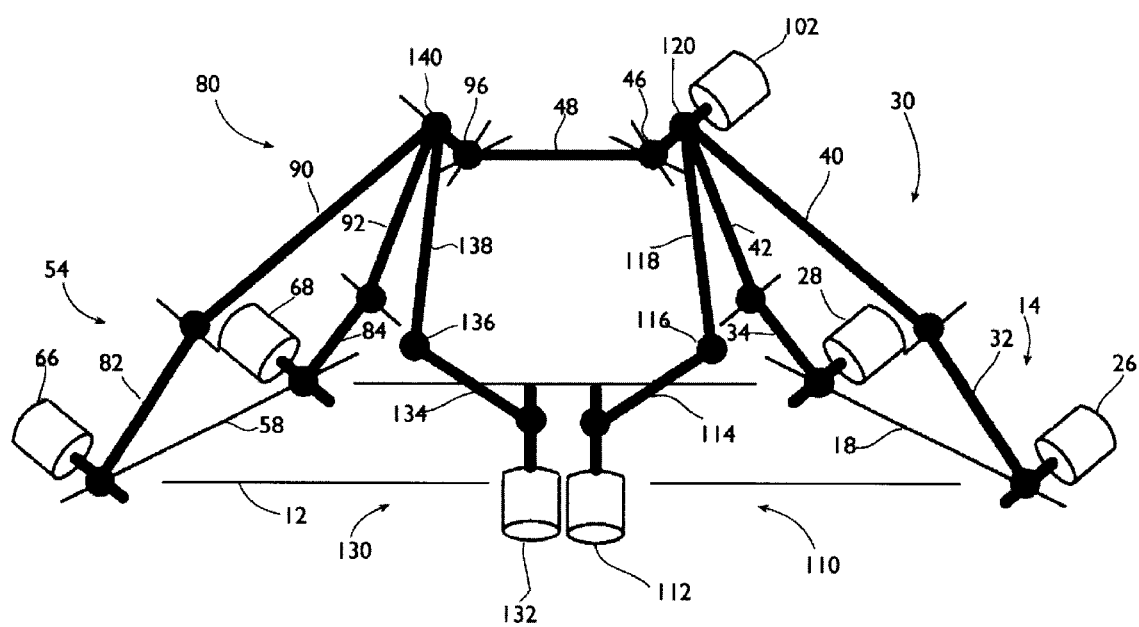

FIG. 5. Redundantly actuated hybrid serial/parallel manipulator with waist linkages.

Figure 6:
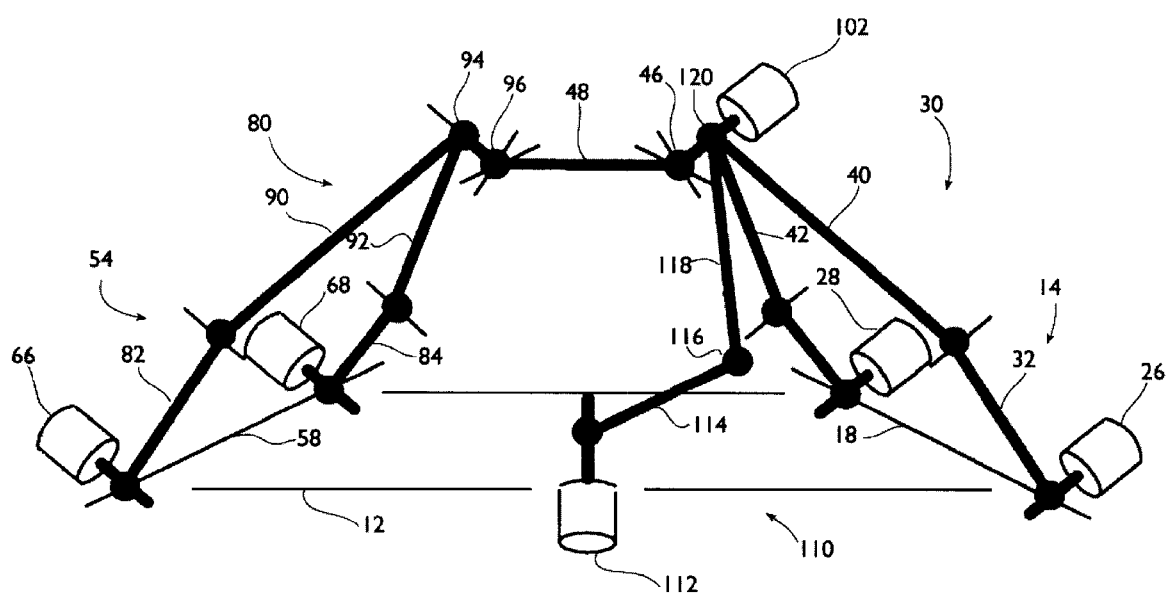

FIG. 6. End-Effector actuated hybrid serial/parallel manipulator with waist linkage.

Figure 7:
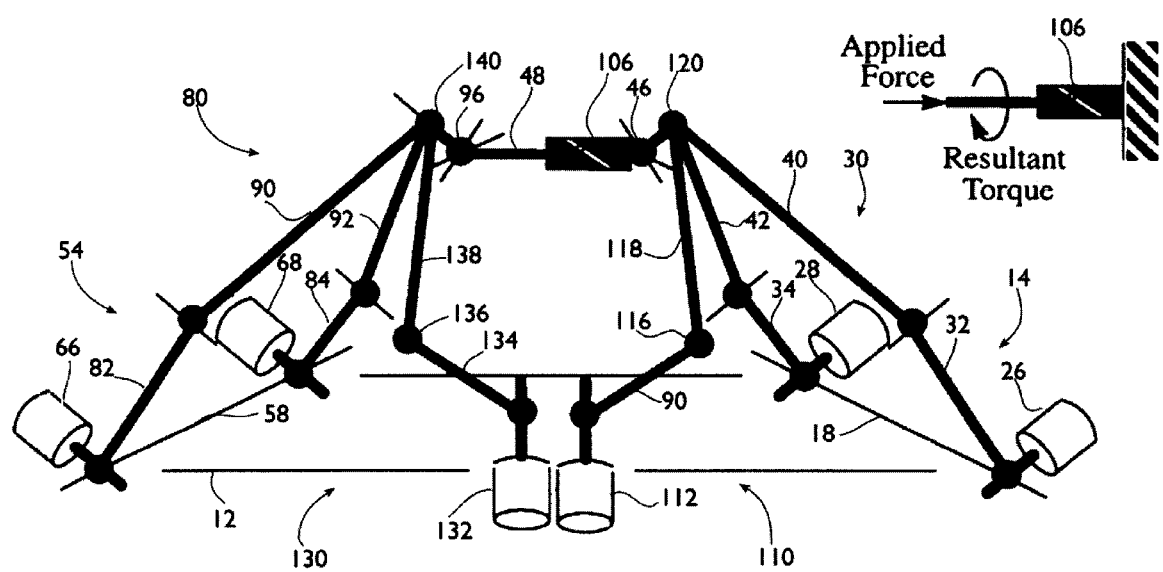

FIG. 7. Base actuated hybrid serial/parallel manipulator with waist linkage.

Figure 8:
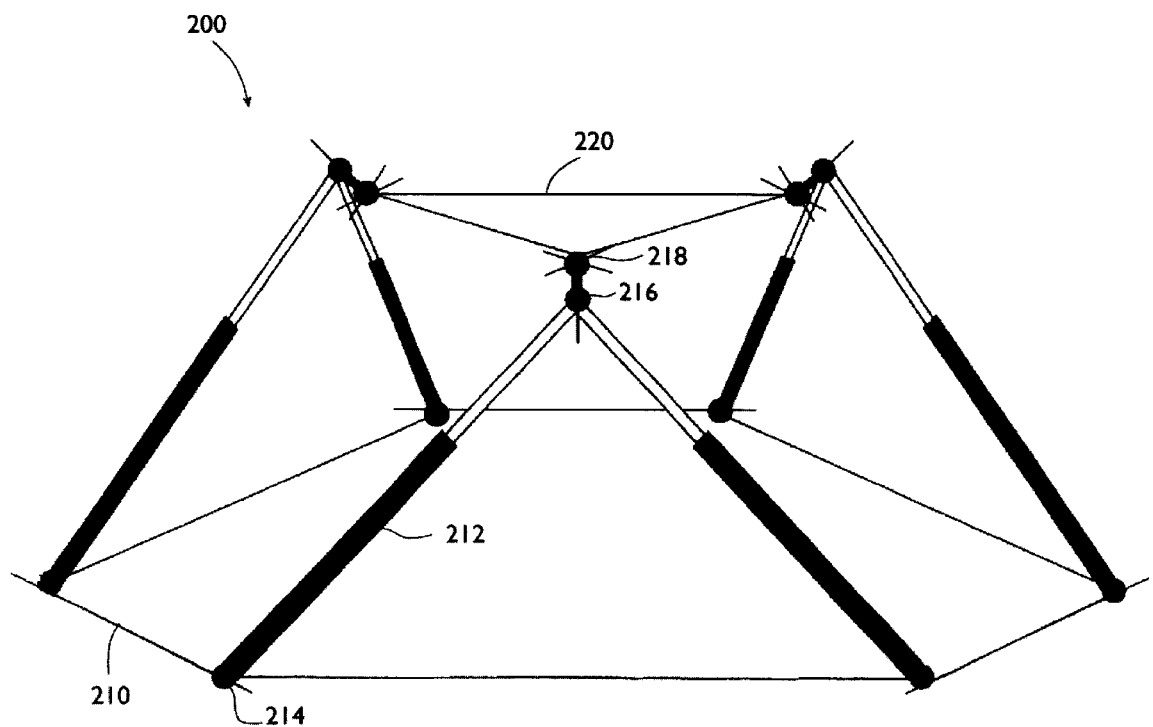

FIG. 8. Diagram of Stewart Platform (prior art).

Figure 9:
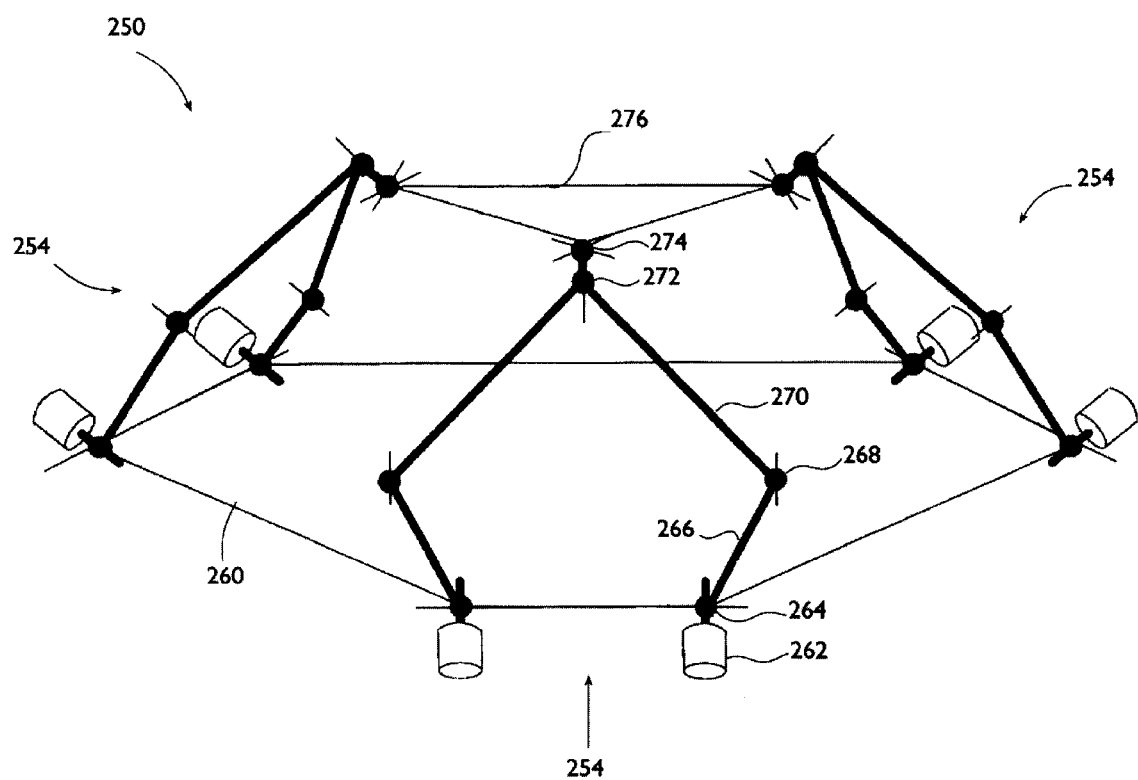

FIG. 9. Diagram of Triple Pantograph Platform (prior art).

Figure 10A:
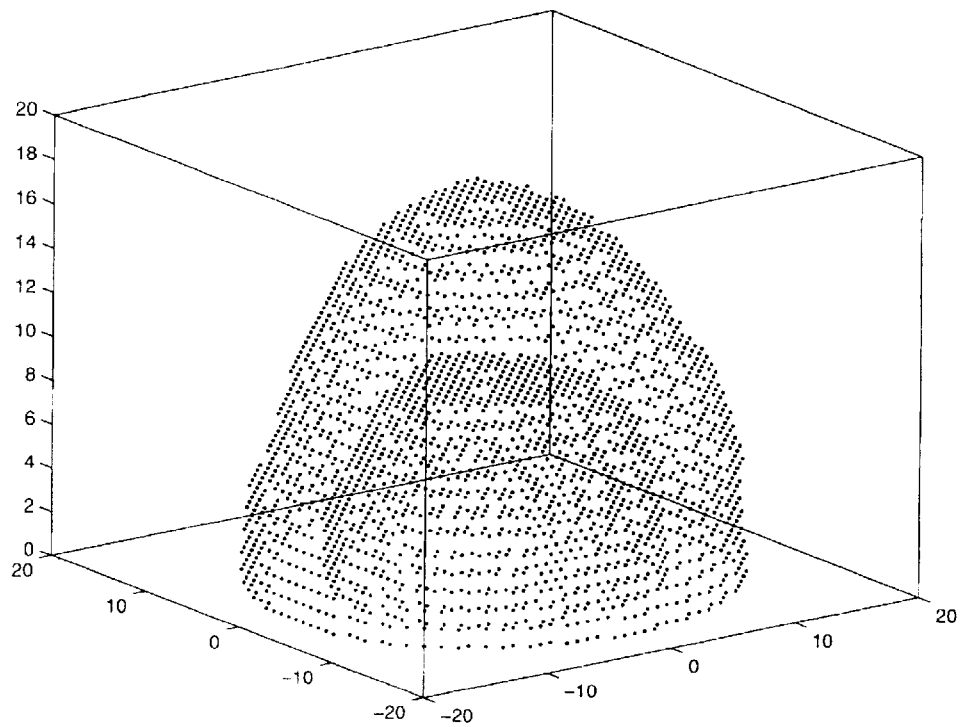

FIG. 10A. Workspace of Stewart platform.

Figure 10B:
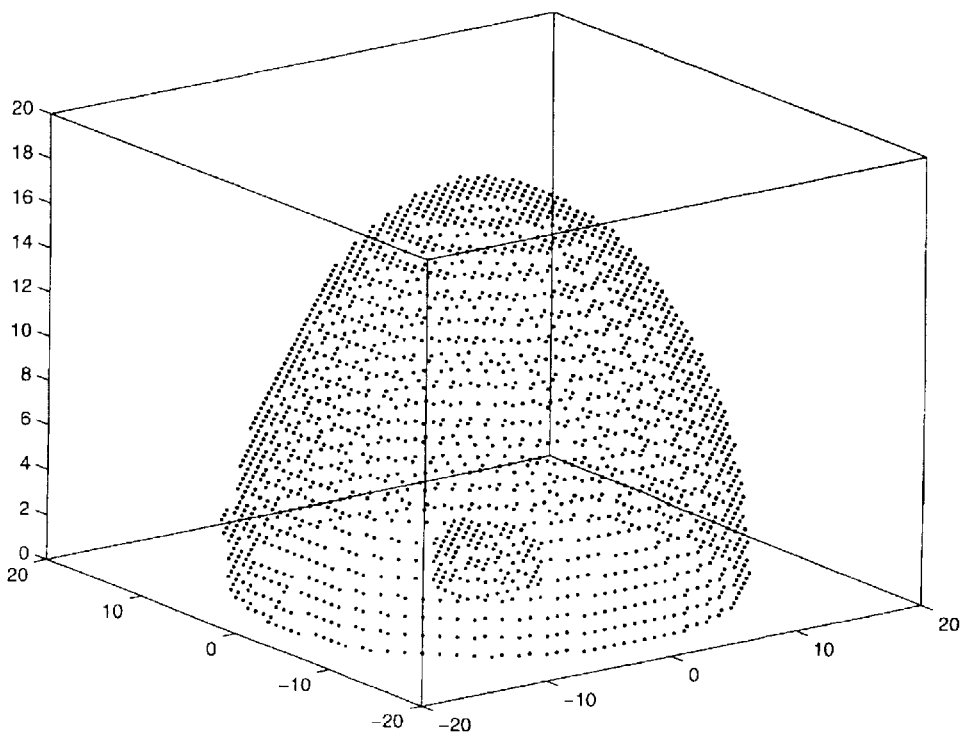

FIG. 10B. Workspace of Triple Pantograph platform.

Figure 10C:
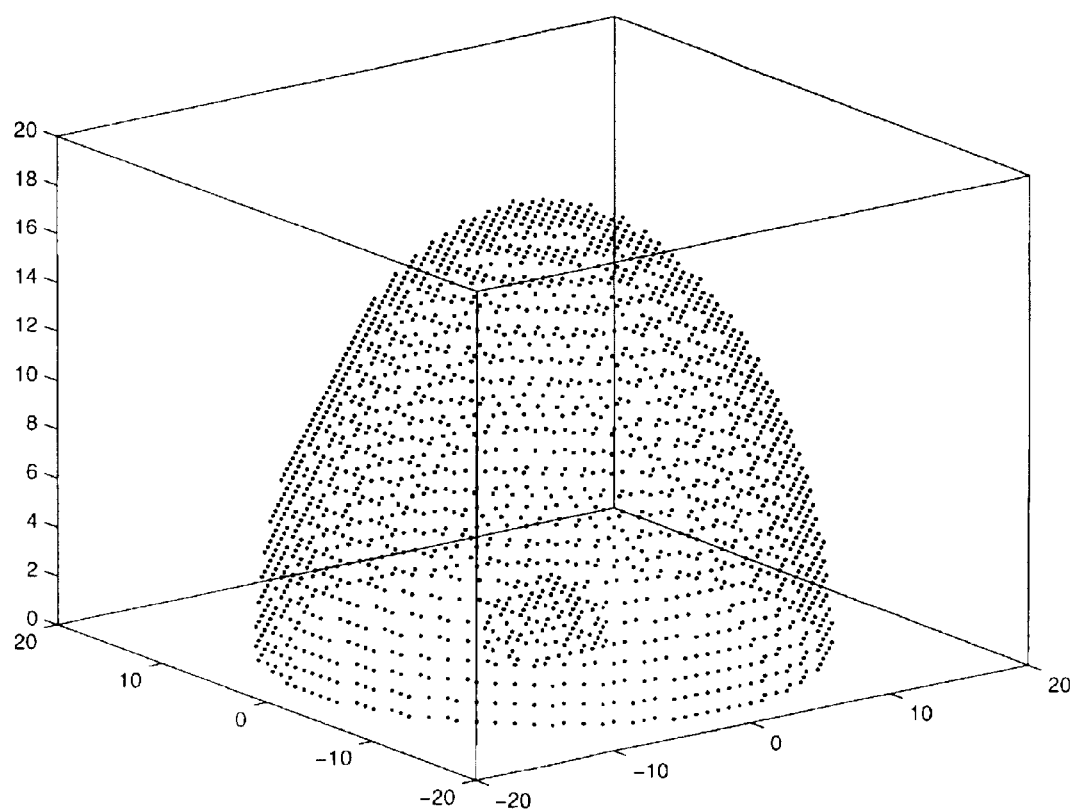

FIG. 10C. Workspace of hybrid serial/parallel manipulator.

Figure 11A:
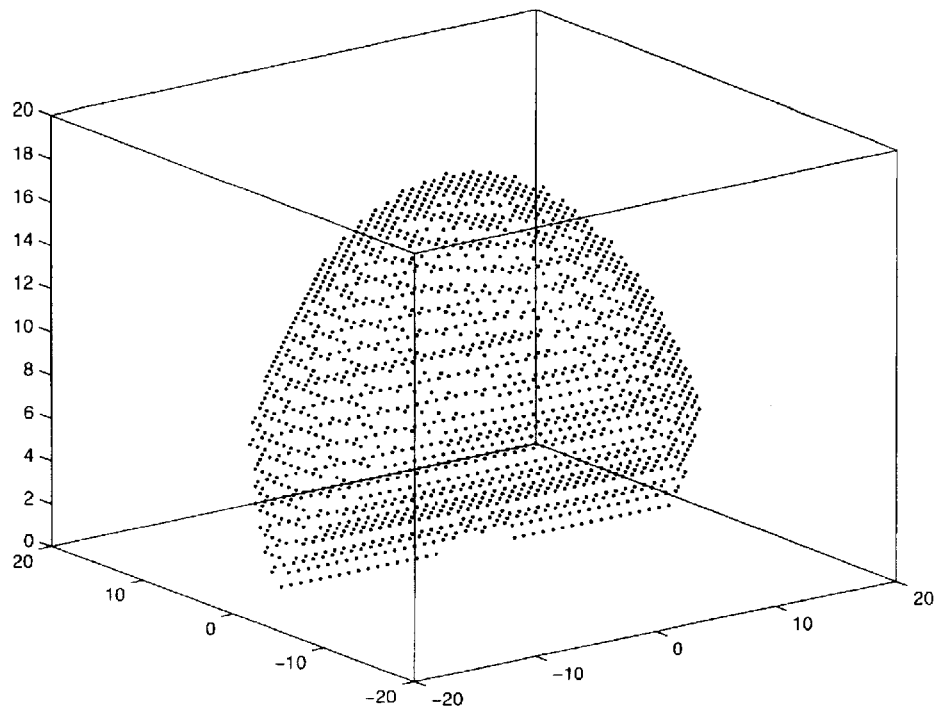

FIG. 11A. Workspace of hybrid serial/parallel manipulator with U-joint constraint.

Figure 11B:
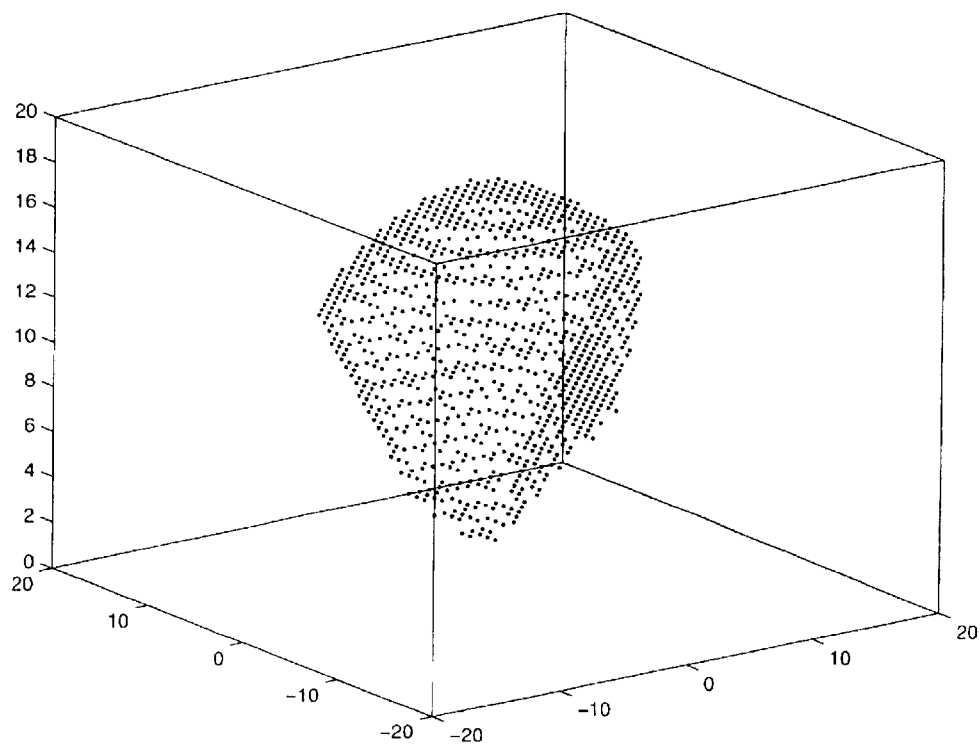

FIG. 11B. Workspace of Triple Pantograph platform with U-joint constraint.

FIG. 12A. Singular configuration #1 of five-bar linkages.

FIG. 12B. Singular configuration #2 of five-bar linkages.

FIG. 12C. Singular configuration #3 of five-bar linkages.

FIG. 12D. Singular configuration #4 of five-bar linkages.

SUMMARY

This represents a novel application of five-bar mechanisms to 5-DOF or 6-DOF motion. The new features are the parallel placement of the folding axes of rotation of the two five-bar linkages, the use of redundant actuation to generate the folding motion of the two five-bar linkages and the addition of a sixth degree of freedom by rotation of the platform independently of the five-bar linkages.

Description—Main Embodiment, FIGS. 1A to 1G

A robotic manipulator, shown generally at 10, made according to the present invention, is illustrated in FIGS. (1A) to (1G). Manipulator 10 includes a base 12 or frame upon which is mounted waist/shoulder assemblies 14 (see FIG. 1C) and 54; to these in turn are attached five-bar linkages 30 and 80, which are in turn attached to either side of a platform 48 by means of joints 44, 46, 94 and 96 as shown in FIGS. 1F and 1G.

Device 10 forms a six degree of freedom hybrid serial/parallel robot. Waist/shoulder assemblies,14 and 54, and five bar linkages, 30 and 80, provide five degrees of freedom, while a motor 100 mounted on five-bar linkage 80 and connected to the platform 48 by means of universal joint 96 and a gear train 98 (see FIG. 1C) provides the sixth degree of freedom.

Waist/shoulder assembly 14, shown in FIG. 1D, is composed of three motors 16, 26 and 28, with waist link 18 driven by motor 16. The link rotates at one end in bearing 20 which is fixedly mounted to the base by bearing support 24; at the other end, the rotating shaft of motor 16 is fixedly attached to waist link 18, while the motor body is fixedly attached to base 12 by waist motor support 22. Near each end of waist link 18, motors 26 and 28 are fixed to waist link 18 by motor clamps 27 and 29, respectively, (see FIG. 1D) which fixedly attach the case of the motor to the waist link 18. The motors 26 and 28 are oriented with their driven shafts at right angles to waist link 18, mutually parallel and pointing outward from the middle of base 12.

Five-bar linkage 30 is composed of waist link 18 and four other linkages, 32, 34, 40 and 42. Proximal links 32 and 34 are fixedly attached to the rotating shafts of motors 26 and 28, respectively. They are mounted at right angles to these shafts, and protrude in a direction that is generally away from base 12. Distal links 40 and 42 are attached to proximal links 32 and 34, respectively, by pin joints 36 and 38, also known as the elbow joints. The distal links rotate in the same plane as the proximal links. The two distal links, 40 and 42, are joined by a third pin joint 44 (see FIG. 1F), known as the wrist joint.

The shaft of wrist joint 44 is attached to one end of a two degree of freedom universal joint 46, the other end of which is fixedly attached to one side of a disk-shaped platform 48. The shaft of wrist joint 44 is free to rotate independently of distal links 40 and 42.

The other side of the overall structure, waist/shoulder assembly 54 and five-bar linkage 80, is symmetric with respect to the first side, except that tie shaft 95 of wrist joint 94 is driven by the platform motor 100. This half of the assembly is described in the next three paragraphs.

Waist/shoulder assembly 54, shown in FIG. 1E., is driven by three motors 56, 66 and 68, with waist link 58 driven longitudinally by waist motor 56. The link rotates at one end in bearing 60 which is fixedly mounted to base 12 by bearing support 64; at the other end, the rotating shaft of waist motor 56 is fixedly attached to waist link 58, while the body of waist motor 56 is fixedly attached to base 12 by waist motor support 62. Near each end of waist link 58, shoulder motors 66 and 68 are fixed to waist link 58 by motor clamps 67 and 69, respectively, which fixedly attach the cases of shoulder motors 66 and 68 to waist link 58. The shoulder motors are oriented with their driven shafts at right angles to waist link 58, mutually parallel and pointing outward from the middle of base 12.

Five-bar linkage 80 is composed of waist link 58 and four other linkages, 82, 84, 90 and 92. Proximal links 82 and 84 are fixedly attached to the rotating shafts of shoulder motors 66 and 68, respectively. They are mounted at right angles to these shafts, and protrude in a direction that is generally away from base 12. Distal links 90 and 92 are attached to proximal links 82 and 84, respectively, by pin joints 86 and 88, also known as the elbow joints. The distal links rotate in the same plane as the proximal links. The two distal links, 90 and 92, are joined by a third pin joint 94, known as the wrist joint.

The shaft of wrist joint 94 is attached to a two degree of freedom universal joint 96, the other end of which is fixedly attached to one side of a disk-shaped platform 48. The shaft of wrist joint 94 rotates independently of distal links 90 and 92, and is connected to platform motor 100 by means of gear train 98; this gear train, which may consist of internal gears or a flexible, rotating cable, permits platform motor 100 to be placed in a convenient location on link 90.

A handle 50 is placed on platform 48. This handle is representative of any number of payloads that can be placed on device 10. The handle represents the device's operation as a hand controller; the device can also be used as an active positioner.

Operation—Main Embodiment, FIGS. 1A to 1G

As shown in FIG. (1A), each five bar linkage (30 and 80) has three motors at its base—two to drive wrist joints 44 and 94 in the plane of the linkage, and a third to rotate the plane of the five-bar linkage about its base at waist links 18 and 58, respectively. (Motors 26, 28, 66 and 68 that drive five-bar linkages 30 and 80 in their own planes are termed "shoulder motors" while the plane rotation, or five-bar linkage folding, motors 16 and 56 are termed "waist" motors.)

The top ends of each linkage (30 and 80) are attached to the platform by means of universal joints 46 and 96, respectively. Each linkage (30 and 80)) can execute motions in three degrees of freedom, but the two linkages 30 and 80 are tied together at platform 48, so five degree of freedom motion results—three degrees of freedom in translation, and two of rotation.

Platform motor 100, mounted on one of the five bar linkages (80), provides power to rotate the platform about the axis defined by the two universal joints 46 and 96. The rotational torque is coupled through universal joint 96. The seventh motor is termed the "platform" motor.

Device 10 is equivalent to two elbow manipulator arms with passive spherical wrists, joined at their distal ends through an actuator aligned with the wrist centers.

Consider the operation of one of the five-bar linkages 30 or 80 in detail. The two shoulder motors 26 and 28 of five-bar linkage 30 permit wrist joint 44 of the linkage to be moved in the plane of linkage 30. Shoulder motor 26 rotates proximal link 32 about its end which is attached to the motor shaft, while shoulder motor 28 rotates proximal link 34 about its end. These rotations may occur independently; the rotations force distal link 40 and 42 to rotate in a constrained manner, revolving about pin joints 36, 38 and 44.

The inverse and direct kinematics of this mechanism are easily computed and are not described here. It can be shown that the singular configurations of the hybrid serial/parallel manipulator occur when and only when (i) either of the five-bar linkages is in a singular configuration (see FIG. 12A and 12B), (ii) the tip of a five-bar linkage intersects the axis of the five-bar linkage waist (see FIG. 12, #3, #4), (iii) either of tie five-bar linkages is at its workspace limit or (iv) the tips of the five-bar linkages align with a distal link of either five-bar linkage (this corresponds to a spherical wrist singularity).

The five-bar linkage singularities are not particularly problematic since, by design, singularity 12A is eliminated if $a>2b$, and singularities 12B, 12C and 12D are eliminated if $c>(b+a/2)$.

Description—Alternative Embodiments, FIGS. 3 to 4

Alternative embodiments of the hybrid serial/parallel manipulator are shown in FIGS. (3) to (4), with FIG. (2), the main embodiment, redrawn in the same style as FIGS. (3) to (4). Joints are represented by solid round dots, links by straight lines between the joints, and motors, by cylinders with protruding lines representing drive shaft. Waist motor 56 is shown on the same side of base 12 as waist motor 16, rather than on the opposite (or back) side of base 12, but the operation is unaffected by this arrangement. Likewise, the view is from the front, with platform motor 102 operating from the right; universal joint 46 therefore becomes the driven joint, and universal joint 96, the passive joint.

FIG. (2) is kinematically equivalent to FIG. (1), except that gear train 98 is removed, and platform motor 100 is replaced by platform motor 102 of which the drive shaft is now fixedly attached to the pin of pin joint 94. In FIG. (3), waist motors 56 is eliminated, since it is redundant, and replaced by passive joint 104. (This joint is fixedly connected to base 12 by a support, but neither base 12 nor the support is shown in this symbolic illustration.)

In FIG. (4), two waist motors (16 and 56) are again shown, but the platform motor is replaced by a passive mechanism (106) to rotate the platform when it is squeezed axially. Platform motor 102 is eliminated, and a rotation mechanism (106) is interposed between platform 48 and universal joint 46 (which is now a passive universal joint, not directly driven by any motor). (Universal joint 46, although passive, is fixedly attached to distal link 40 in order to set a reference position for the platform.)

Operation—Alternative Embodiments, FIGS. 3 to 4

The alternative embodiment of FIG. 3 operates in the same way as the main embodiment, FIG. 2, except that the missing waist motor 56 forces the waist axis (waist link 58) to passively follow the movement induced by the remainder of the assembly. While there may be some loss of power in this arrangement, all movements throughout the workspace are nevertheless possible, in the following manner.

The positions of joint 44 and universal joint 46 are fully determined by the action of waist/shoulder assembly 14 and five-bar linkage 30. Working together, these position the right side of platform 48 in space relative to base 12. (Shoulder motors 26 and 28 move five-bar linkage 30, and hence position wrist joint 44 in the plane of linkage 30, while waist motor 16 rotates the plane of the linkage 30 about its waist link 18; that is, wrist joint 44, being in this plane, is moved by waist motor 16 in an arc centered about waist link 18.) The other end of platform 48 is located by the action of five-bar linkage 80. Since the length of the platform is fixed, then as five-bar linkage 80 moves in the plane of 80, universal join 96 is forced to move along a circle centered on the other universal joint 46, with radius equal to the distance across the platform between universal joints 46 and 96. Wrist joint 94, being fixedly attached to universal joint 96, is therefore located unambiguously in space. Wrist joint 94, together with the fixed locations of the end points of waist link 58, determines the orientation (if the plane of five-bar linkage 80, and hence, the angle of waist link 58 relative to base 12. In other words, the action of the six motors have completely determined the rotation of waist link 58 of the waist/shoulder assembly 54.

Please note that, while the elimination of a redundant actuator is possible, the presence of the actuator has certain advantages—greater power, and the ability to perform self-calibration by posing the structure in various positions while the joint positions and joint torques are read.

The structure of FIG. 4 is a variation built on FIG. 2, with the platform motor replaced by passive rotation mechanism 106. The action of this mechanism 106 is shown in the inset of FIG. 4. As the mechanism is squeezed or compressed axially, the drive shaft rotates. (This could be effected by a passive screw inside the mechanism, or by an equivalent screw formed from a recirculating ball bearing assembly.) As the mechanism is placed under tension, rotation in the opposite direction occurs. The compressive or tensile force is provided by the action of driven waist/shoulder assemblies 14 and 54 and five-bar assemblies 30 and 80. Each assembly can locate the universal joint at either end of the platform in three degrees of freedom. Assemblies 14 and 30 control the position of wrist joint 44 and hence universal joint 46, fixedly attached to wrist joint 44, while assemblies 54 and 80 control the position of wrist joint 94 and hence the position of universal joint 96, which is fixedly attached to wrist joint 94. By altering the distance between the two universal joints, 46 and 96, rotational mechanism 106 is moved to different extensions, and hence platform 48, fixedly attached to the drive shaft of the mechanism, is rotated.

Description—Alternative Embodiments, FIGS. 5 to 7

In FIGS. (5) to (7), the waist movement (the rotation of five-bar linkages 30 and 80 about waist links 18 and 58) is produced by motors which are relocated to the end of waist driving assemblies 110 and 130. In FIG. (5), the two waist assembly motors 112 and 132 are shown side by side, fixedly attached to base 12. (The support are not shown in these symbolic diagrams, nor is base 12 itself.) Fixedly attached to the (drive shaft of motor 112 is a waist assembly proximal link 114; it is attached at right angles to the shaft, protruding in a direction that is generally away from base 12. Proximal link 114 is connected by a two degree of freedom elbow joint 116 to a distal link 118; the other end of distal link 118 is connected to a three degree of freedom wrist joint 120, which replaces wrist joint 44 of the main and alternative embodiments in FIGS. (2) to (4). Elbow joint 116 could be formed from a universal joint, or a ball and socket, or a pin joint connected to a revolute joint attached to proximal link 114; wrist joint 120 could be formed from a universal joint, or a ball and socket, fixedly attached to existing pin wrist joint 44.

Left side waist driving assembly 130 (or waist driving assembly 1) is similar to right side waist driving assembly 110 (or waist driving assembly 2), just described. Waist assembly proximal link 134 is fixedly attached to the drive shaft of waist assembly motor 132; it is attached at right angles to the shaft, protruding in a direction that is generally away from base 12. Waist assembly proximal link 134 is connected by a two degree of freedom elbow joint 136 to waist assembly distal link 138; the other end of distal link 138 is connected to a three degree of freedom wrist joint 140, which replaces wrist joint 94 of the main and alternative embodiments in FIGS. (2) to (4).

In FIG. (6), waist driving assembly 130 is eliminated, to form a unit generally equivalent to FIG. (3). In FIG. (7), the two waist driving assemblies 110 and 130 are present, but platform motor 102 is replaced by rotation mechanism 106 which is interposed between platform 48 and universal joint 46.

Operation—Alternative Embodiments, FIGS. 5 to 7

Waist driving assemblies 110 and 130, shown in FIGS. (5) to (7), operate in a similar manner to one another. Consider waist driving assembly 110 in FIG.(5). Waist assembly proximal link 114 rotates about the end of waist assembly proximal link 114 which is fixedly attached to the drive shaft of waist assembly motor 112. As the drive shaft is rotated, waist assembly proximal link 114 pushes and pulls on waist assembly distal link 118, the two links being attached by two degree of freedom waist assembly elbow joint 116. The distal link then pushes or pulls on the three degree of freedom waist assembly wrist joint 120. If shoulder motors 26 and 28 hold the five-bar linkage in one position, then as waist assembly wrist joint 120 is pushed or pulled, the plane of five-bar linkage 30 rotates about waist link 18. This accomplishes the same action as performed by waist motor 16, in its position colinear with waist link 18 in FIGS. 1 through 4

Note that 2-DOF waist assembly elbow joint 116 and 3-DOF waist assembly wrist joint 120 in waist driving assembly 110 permit five-bar assembly 30 to move in its own plane without undue restriction imposed by waist driving assembly 110. At a constant rotation angle of waist link 18, movement of waist assembly wrist joint 120 in the plane of five-bar 30 causes joints 116 and 120 to bend in approximately equal angles of opposite sign, around axes that are normal to the plane. At the same time, the angle of waist assembly proximal link 114 to base 12 about an axis which is parallel to the drive shaft of waist assembly motor 112, and the angle of elbow joint 116 about an axis which is parallel to the drive shaft of waist assembly motor 112, change in approximately equal angles of opposite sign, in order to accommodate any changes in the overall distance between waist assembly motor 112 and waist assembly wrist joint 120.

Waist driving assembly 130 operates in an identical fashion to waist driving assembly 110. Waist assembly proximal link 134 rotates about the end of waist assembly proximal link 134 which is fixedly attached to the drive shaft of waist assembly motor 132. As the drive shaft is rotated, proximal link 134 pushes and pulls on waist assembly distal link 138, the two links being attached by two degree of freedom elbow joint 136. The distal link then pushes or pulls on three degree of freedom waist assembly wrist joint 140.

If shoulder motors 66 and 68 hold the five-bar linkage in one position, then as waist assembly wrist joint 140 is pushed or pulled, the plane of five-bar linkage 80 rotates about its waist link 58. This accomplishes the same action as performed by waist motor 56, in its position colinear with waist link 58 in FIGS. 1, 2 and 4.

FIG. (6) shows the hybrid serial/parallel manipulator with the waist driving assembly 130 removed. This is similar to the configuration of FIG. (3), and it operates under the same principles. By removing one redundant actuator, the assembly can still be moved and positioned in six degrees of freedom, albeit without some of the advantages of a redundantly actuated mechanism.

The hybrid serial/parallel manipulator shown in FIG. (7) has both waist driving assemblies 112 and 132, so that both universal joints 46 and 96 can be positioned in space with three degrees of freedom. The distance between universal joints 46 find 96 can therefore be varied, placing pressure or tension on rotational mechanism 106. The action of rotational mechanism 106 is to rotate in one direction when the axis is placed under pressure, or squeezed, and to rotate in the other direction when the axis is under tension.

Comparison with Prior Art

Parallel mechanisms have some impressive advantages and some impressive disadvantages over serial structures. They have better load capacity, stiffness, precision and inertia characteristics. These characteristics are due to the multiple arms which spread the load, and the normal practice of mounting actuators on or close to the base, rather than having them located at the joints and therefore carried by the linkage mechanism. On the other hand, they are known to have complex forward kinematics and smaller non-singular workspaces. Typically, the inverse kinematics are easily worked out in a closed form solution, but the forward kinematics remain a challenge for numerical methods. The workspace limitation becomes apparent when one considers the effect of rotating the platform about an axis normal to the base. At the "home" position, a large rotation angle can be obtained, but this angle is reduced as one nears the edge of the translational workspace. The singular configurations are encountered when a linkage inverts from its normal angle of operation, with the elbow joint bending the "wrong" way, for example. ("Forward kinematics" is the mathematical definition of end-effector or position and orientation from active joint angles or lengths. "Inverse Kinematics" is the mathematical derivation of active joint angles or lengths from end-effector or platform position and orientation. "Workspace" is the set of all positions and orientations achievable by a robot's end effector or platform. "Singular configurations" are individual positions and orientations within a robot's workspace at which the robot's behaviour is not entirely determined by the behaviour of its active joints.)

The prior art falls under three main categories—Stewart platforms and their variants, triple five-bar supported platforms, and dual support devices. Stewart platforms and the triple five-bar devices will be covered in the next few paragraphs. The present invention falls under the dual support category. The only other member of this category that is known to the authors is Iwata's 1990 pen-based haptic device. In Iwata's device, the platform (a haptic pen) is supported by two serial manipulators. The present invention changes the 3-DOF serial (elbow) manipulators to 3-DOF hybrid serial/parallel supports (folding planar five-bar linkages), thereby imparting some of the advantages of parallel mechanisms—increased load-bearing potential, accuracy and stiffness, and reduced inertia. Moreover, the folding five-bar mechanism has the added advantage of excellent isotropy within its workspace. In Iwata's device, in order to yaw the the platform by means of the screw mechanism, the distance between the universal joints connected to the supporting serial robots must be changed. At mechanism configurations where the pen aligns with the planes of the supporting elbow manipulators, Iwata's mechanism is singular. In the present invention, the use of a separate actuator to provide the yawing motion is proposed. Thus seven actuators, not six, are used to provide 6-DOF motion of the platform. Due to actuator redundancy, configurations for which the platform yaw axis aligns with the planes of the five bar linkages are not singular. Therefore, with a seventh actuator for the platform yaw motion, the proposed mechanism has a substantially larger non-singular workspace.

At the outset of the project, three candidates were compared in terms of their complexity and workspace—a prismatically actuated "Stewart" platform (Fischter, E. F., 1986, "A Stewart platform-based manipulator: general theory and practical construction", Int. J. Robotics Res., vol. 5, No. 2, pp. 157–182), a five-bar linkage actuated "Triple Pantograph" platform (Mimura N. & Funahashi Y., 1995, "A new analytical system applying 6 DOF parallel link manipulator for evaluating motion sensation", IEEE International Conference on Robotics and Automation), and a novel series/parallel mechanism which is the subject of this patent. Diagrams of the Stewart platform and the Triple Pantograph are shown in FIGS. (8) and (9); the hybrid series/parallel manipulator is shown in FIGS. (1) to (7), and is best seen for this purpose in the symbolic diagram of FIG. (2).

The hybrid series/parallel manipulator has eleven fewer passive revolute joints and one less U-joint than either of the other two manipulators, resulting in less friction and backlash. There could be a significant inertial contribution from the wrist actuator, but this depends on the yawing torque requirements of the application. In some applications, such as the use of the platform as a haptic pen, very little or even a passive yaw degree of freedom may be sufficient, thus a light motor or just a bearing can be used. It should be noted that the drawback of the additional yawing actuator mass is partially offset by having two fewer base to platform linkages. By actuating and sensing the folding or "waist" axis of each five-bar linkage, a platform singularity is eliminated and the kinematics of the platform are highly simplified. The singularity that is eliminated occurs when the attachment points of the platform to the five bar linkages lie in either one of the planes of the five-bar linkages.

In the following, a comparison between the workspaces of the three candidates are presented. For a fair comparison, the mechanisms were sized to have similar footprints and favorable geometries. For the Stewart platform, an optimization of the Jacobian matrix carried out in Lawrence and Chapel (Lawrence, D. A and Chapel, J. D., 1994, "Performance trade-offs for hand controller design", Proc. IEEE Int. Conf. Robotics & Automation, San Diego, Calif. pp. 3211–3216) suggests triangles for the base and platform, with a 2:1 base to platform ratio. With the link lengths approximated from the vertical range presented in Lawrence & Chapel, the resulting geometry is tabulated in Table 1 where $q_{min}$ and $q_{max}$ refer to the minimum and maximum possible lengths of the Stewart platform's prismatic actuators.

TABLE 1

Robot Geometry

| | Robot Parts | | | | | | |
|---|---|---|---|---|---|---|---|
| Robot | Strut min length (212) $q_{min}$ | Strut max length (212) $q_{max}$ | Waist length (212 base) (254 base) (18, 58) a | Proximal link length (266) (32, 34, 82, 84) b | Distal link length (270) (40, 42, 90, 92) c | Base half-length (210) (280) (12) $L_B$ | Platform half-length (220) (276) (48) $L_P$ |
| Stewart platform | 9 | 18 | 3.5 | n/a | n/a | 2 | 1 |
| Triple Pantograph | n/a | n/a | 2 | 8 | 10 | 2 | 1 |
| Hybrid serial/parallel manipulator | n/a | n/a | 2 | 8 | 10 | 2 | 1 |

Next, parameters for the Triple Pantograph platform were chosen to make it similar to the Stewart platform. Links b and c were selected to add up to $q_{max}$ and were made similar in length to achieve good range while maintaining c>(b+a/2) to avoid singularities. The platform remains identical but the base could not be made triangular as a high degree of linkage collisions would occur in practice. The footprint is therefore kept similar but a is approximately halved.

The geometry of the hybrid serial/parallel manipulator was made identical to that of the Triple Pantograph platform. Its alternative architecture is its only distinction.

In FIG. (10), the "semi-dextrous" workspaces of each of the three candidate mechanisms are displayed. A point belongs to such a semi-dextrous workspace if the mechanism end-point (the platform centroid) can be placed there and rotated ±30° about an arbitrary orientation axis.

The Triple Pantograph and Hybrid Serial/Parallel platforms have very similar workspaces which are clearly superior to that of the Stewart platform, which has a large void in its centre due to the constraint of prismatic cylinders which can, at best, retract to half of their full length. The superiority of the hybrid serial/parallel manipulator over the Triple Pantograph becomes explicit after considering a constraint of the U-joints that join the five-bar linkages to the platforms. Due to typical physical constraints and also to avoid singular positions, the U-joints are not allowed to exceed ±85°. The resulting workspaces are shown in FIG. (11).

In conclusion, existing six degree of freedom parallel platform robots, such as the Stewart Platform and a similar design which uses three five bar linkages, suffer from a number of drawbacks:

restricted nonsingular workspaces, large numbers of design parameters (making geometric optimization difficult), high potential for link collisions at certain positions, and difficult computation of platform position from the actuator positions or forward kinematics.

The new design has the following advantages:

a reduced number of linkages between thin platform and base, and therefore fewer passive joints, resulting in less backlash and friction.

less prone to collisions between linkages a larger workspace with fewer design parameters making geometric optimization easier both the forward and inverse kinematics can be calculated analytically, the addition of a single redundant actuator not only enhances the dynamic capabilities with little additional moving mass, but also reduces the number of singular positions.

a limitless motion range in one of its angular degrees of freedom due to the serial actuator connected directly to the platform.

the seventh acutuator can be eliminated a together, resulting in a 5-DOF device; this is not possible with the Triple Pantograph or the Stewart Platform.

It is also possible to implement a tendon transmission system for the serial actuator to avoid carrying the mass of an actuator on the end effector. Alternatively, actuated extensible struts or auxiliary five-bar linkages could be used to give the platform a limited rotation, if this is called for by an application. (Note that this is distinguished from the Triple Pantograph by the use of actuated folding axes on the dual support structures, which give the device many of the advantages just listed.)

Summary, Ramifications, and Scope

Accordingly, it should be clear that the above geometrical constraints and description outline the concepts of a novel six degree of freedom manipulator having the following advantages over previous concepts:

a reduced number of linkages between the platform and base, and therefore fewer passive joints, resulting in less backlash and friction.

a larger workspace free of singularities and collisions between linkages.

fewer design parameters making geometric optimization much more feasible.

analytical solutions to both the forward and inverse kinematics.

actuator redundancy that not only enhances the dynamic capabilities with little additional moving mass, but also increases the non-singular workspace.

a limitless motion range in one of its angular degrees of freedom due to the serial actuator connected directly to the platform.

The device could be used in any application where stiffness and precision are of utmost importance and a parallel platform type robot is preferred. It could be used as a master and/or slave robot in a teleoperation system. It could be used in virtual reality systems which incorporate robotic hand controllers or motion simulators. It can be used to create a force feedback input/output computer pointing device which has unlimited applications including human perception research, interactive computer-aided design interactive video games, interactive workspace managers and any other software application which can benefit from the incorporation of three dimensional translation/rotation tactile information exchange. Some or all of the actuators could be replaced with locking joints to create a multi-degree of freedom positioning table, or with passive joints to create a multi-degree of freedom position sensor. It can be used as an assembly robot or be made at a small scale for use as a six degree of freedom wrist for a serial robot. It could be made at a large scale for use in aircraft, car, trucking or other heavy-equipment simulators.

Other actuator concepts beyond those illustrated are possible. For example, it is possible to remove the platform actuator altogether, when orientation of the platform is not necessary. Alternatively, one can implement a tendon transmission system for the platform actuator to avoid carrying the mass of an actuator on the end effector. By installing the platform motor on the base and setting pulley wheels into the wrist, elbow and shoulder joints of one of the five-bar linkages, the action of the platform motor can be communicated efficiently to the platform by the use of tendons. Auxiliary actuated linkages or extensible links could also be used to give limited tilt to the platform.

Another variation on actuation of the alternative embodiments shown in FIGS. (5) to (7) can be created by substituting linear actuators for the waist assembly motors 112 and 132, and using a single rod in place of the linkages 114, 118, 134 and 138; the linear actuators would need to have rotatable supports.

Accordingly, the scope of the invention should be determined not by the embodiments illustrated, but by the appended claims and their legal equivalents.

We claim:

1. A manipulator comprising of a pair of symmetrical 5 bar linkages, each said linkages having a waist link, a pair of proximal links each mounted on said waist link in spaced relationship for movement around spaced parallel axes each extending substantially perpendicular to said waist link, each of said proximal links having a motor for moving its proximal link about its axis of said pair of parallel axes, a pair of distal links one pivotably connected to each of said proximal links on its pivotal axis which is substantially parallel to said pair of axes and a pivotal connection interconnecting an end of each said distal links remote from said proximal links, a platform, a pair of universal joint type connectors connecting a pair of opposite sides of said platform with its adjacent free end of it adjacent said pair of 5 bar linkages, and a drive motor means driving at least one of said waist links for rotation about its longitudinal axis and a platform motor for driving one of said universal joint connectors.

2. The manipulator as defined in claim 1 wherein said drive motor means comprises a pair of motors one for driving each of said waist links.

* * * * *